BEST AVAILABLE COPY

G. KEITEL.

COLLAR SUPPORT.

APPLICATION FILED SEPT. 17, 1909.

Reissued Jan. 4, 1910 13,070

WITNESSES:

Nowitzkrife

Paul Wolff

INVENTOR

G. Keitel

BY

Duell, Warfield & Duell

ATTORNEYS.

UNITED STATES PATENT OFFICE.

GÜNTHER KEITEL, OF NEW YORK, N. Y.

COLLAR-SUPPORT.

13,070. Specification of Reissued Letters Patent. Reissued Jan. 4, 1910.

Original No. 900,932, dated October 13, 1908, Serial No. 432,585. Application for reissue filed September 17, 1909. Serial No. 518,300.

*To all whom it may concern:*

Be it known that I, GÜNTHER KEITEL, of New York, in the county of New York and State of New York, have invented a new and useful Improvement in Collar-Supports, of which the following is a full, clear, and exact description.

This invention relates to neckwear and more particularly to devices for supporting a collar and holding it in an upright position.

One of the objects thereof is to provide a simple, practical, and unitary device adapted to be affixed to a collar to hold it in the desired shape.

Another object is to provide a device of the above type of cheap and durable construction and so formed as to permit a ready separation of its parts and yet securely hold them in assembled condition.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
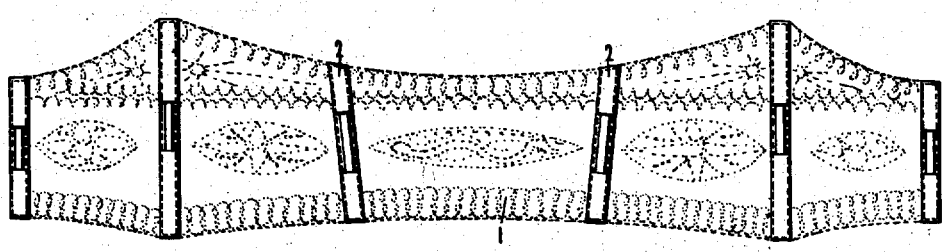
Figure 2:
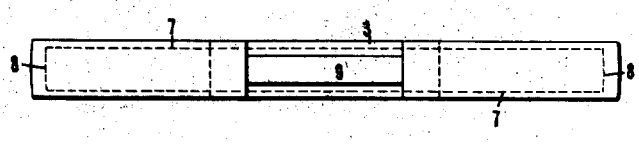
Figure 3:
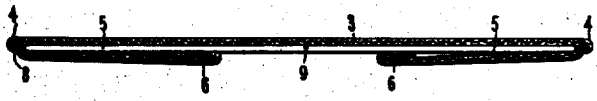
Figure 4:
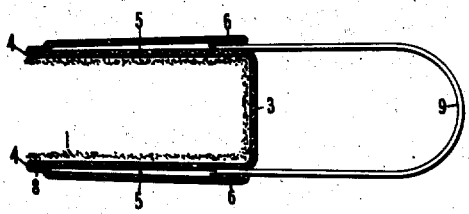

In the accompanying drawings, wherein is shown an embodiment of this invention, Figure 1 is a view of a collar of the type with which this invention indirectly deals, having affixed thereto the stiffening devices or supports; Fig. 2 is a front view of the stiffening device; Fig. 3 is a longitudinal section of the same in flat form; Fig. 4 is a similar view showing the method of removal or insertion of the stiffening element.

Similar reference characters refer to similar parts throughout the several views.

As conducive to a more ready understanding of this invention, it may be noted that it does not deal broadly with stiffening devices or stays, or even with stays for use in clothing, but with a device of this nature peculiarly adapted to be affixed to and form a part of a lady's collar. As will be seen hereinafter there are no rough edges or projecting portions whereby it can be worn next the skin without discomfort, and it is so formed as to be small, compact, and inconspicuous, adapting it for use in a lace or other open-work collar without detracting from the appearance thereof. Furthermore, it may be noted that certain features of this invention deal with the problem of providing a device of the above nature in which the resilient element can be readily and quickly removed and reinserted without undue wear, and yet will not snap out of position even when exposed to the sharp bending of the neckwear in use.

Referring now to Fig. 1 of the accompanying drawings, there is shown a collar 1 having secured thereto in an upright position the several stays 2 extending substantially from the lower to the uppermost edge thereof. As shown in Figs. 2 and 3, these stays comprise a strip 3 of fabric, preferably tape, which is folded upon itself at the points 4 to form pockets 5, the aggregate length of which is preferably more than one-half of the length of the entire device. The ends of strip 3 are again folded, preferably within the pockets, as indicated at 6, and thus provide a reinforcement at the point of most severe wear and have other advantages, hereinafter detailed. The entire device is longitudinally stitched as indicated at 7, the stitching preferably extending from end to end of the device, and may be extended across the ends at 8 substantially at the extreme tips, although this transverse stitching may be dispensed with if desired. Within these pockets is removably fitted a resilient stiffening element 9 formed of celluloid or other suitable substance. This stiffener is preferably flat, and so shaped as to fit snugly between the seams 7 and beneath the reinforcing portion 6, and is inclosed by the pockets for a majority of its length. In this manner the member 9 is prevented from buckling away from the strip 3 and the collar to which it is secured when exposed to the sharp bending or other distortion to which neckwear is subjected. Furthermore, this depth of the pockets prevents the resilient member from snapping out of place in use upon a collar, and yet permits its ready removal, as for washing the collar, when bent to the extreme degree indicated in Fig. 4 of the drawings. It may also be noted at this point that the stiffening element extends substantially to the extreme end of the entire device and hence adapts it to support the extreme upper and lower edges of the collar and prevent rolling of the same without projecting beyond these edges in an unsightly manner.

By the formation of this device as above set forth the tape presents smooth edges at the sides, and in fact there are no exposed rough edges subject to fraying, whereby the device may be worn inside a collar without irritating the skin. Furthermore, as the depth of pockets prevents the hard resilient member from buckling away from the collar there is no chafing of the skin due to this cause. The entire stiffener is compact and self-contained, and is thus well adapted for use in open-work neckwear without detracting from its appearance.

In the use of the device it is sewn or otherwise affixed to the collar, as indicated in Fig. 1, and, while holding it in precisely the desired shape, it does not place any stress upon the most delicate neckwear, as the entire tension exerted by the resilient member is taken up by the strong connecting portion of the tape 3. When it is desired to wash the collar it is sharply bent as indicated in Fig. 4 and the stiffeners are readily removed. The reinsertion of these elements is much facilitated by the smooth, strong, rounded edge presented by the folded reinforcement 6, which is readily separated from the back portion of the strip 3 to permit the entry of the end of the member 9. It will thus be seen that there is provided a device in which the objects of this invention are achieved and the above noted advantages gained. The cost of manufacture is low, the parts are durable and easily manipulated, and it is peculiarly adapted to meet the conditions of use upon an article of neckwear.

As certain changes might be made in the above described embodiment without departing from the scope of this invention, it is to be understood that all matter herein described or shown in the accompanying drawings is to be interpreted as illustrative and not in a limiting sense.

Having described my invention, what I claim as new and desire to secure by Letters Patent is:

1. As an article of manufacture, a device formed and proportioned to act as a stiffener for collars, comprising a strip of resilient material and a narrow strip of fabric extending the full length of the device and having each end portion doubled upon itself with the side edges secured together to form spaced pockets open at the inner opposite ends for the insertion of the resilient member, whereby the stiffener may be attached to a base fabric with the stay out of contact with said base fabric.

2. As an article of manufacture, a stiffening device or support proportioned to act as an upright stiffener for collars, comprising a strip of fabric folded upon itself at each end and stitched at each side to form pockets, and a resilient member having its ends removably fitted within said pockets, said pockets being proportioned to inclose a majority of the length of said member, whereby said member is securely held in position in the use of the device.

3. As an article of manufacture, a stiffening device or support proportioned to act as an upright stiffener for collars comprising a strip of fabric folded upon itself at each end and stitched to form pockets, and a resilient member having its ends removably fitted within said pockets, said pockets being formed to permit said member to extend substantially to the extreme end of the device, whereby the edges of the collar are supported.

4. As an article of manufacture, a stiffening device or support proportioned to act as an upright stiffener for collars, comprising a piece of tape folded upon itself at each end and having substantially parallel stitching extending substantially from end to end of the device, whereby said folded portions form pockets, and a resilient member having its ends removably fitted within said pockets.

5. As an article of manufacture, a stiffening device or support proportioned to act as an upright stiffener for collars, comprising a strip of fabric folded upon itself at each end and having its end edges again folded and stitched at each side through said several folds to form a pair of oppositely disposed pockets, and a resilient member having its ends removably fitted within said pockets passing beneath said folded edges in removal or insertion.

6. As an article of manufacture, a stiffening device or support proportioned to act as an upright stiffener for collars, comprising a strip of fabric folded upon itself at each end and having its extreme edges again folded inwardly and stitched to form pockets within which said edges are folded, and a resilient member removably fitted within said pockets beneath said infolded edges.

7. As an article of manufacture, a stiffening device or support proportioned to act as an upright stiffener for collars, comprising a strip of fabric folded upon itself at each end and having its extreme edges again folded inwardly and stitched to form pockets within which said edges are folded, and a resilient member removably fitted within said pockets beneath said infolded edges, said pockets being proportioned to inclose a majority of the length of said resilient member, whereby said member is securely held in position in the use of the device.

8. As an article of manufacture, a stiffening device or support proportioned to act as an upright stiffener for collars, comprising a strip of fabric folded upon itself at each end and having its extreme edges again folded inwardly and stitched to form pockets within which said edges are folded, and a resilient member removably fitted within said pockets beneath said infolded edges, said pockets being formed to permit said member to extend substantially to the extreme end of the device, whereby the edges of the collar are supported.

9. As an article of manufacture, a stiffening device or support proportioned to act as an upright stiffener for collars, comprising a strip of fabric folded upon itself at each end and having its extreme edges again folded inwardly and stitched to form pockets within which said edges are folded, and a resilient member removably fitted within said pockets beneath said infolded edges, said pockets being proportioned to inclose a majority of the length of said member and being formed to permit said member to extend substantially to the extreme end of the device.

10. An article of neckwear having a plurality of strips secured thereto in upright position, each of said strips being folded upon itself even with the respective upper and lower edges of the collar and being stitched to itself to form pockets, and resilient members removably fitted within the pockets of each of said strips and extending substantially from the top to the bottom of the collar.

GÜNTHER KEITEL.

Witnesses:
HELEN M. SEAMANS,
PAUL A. WOLFF.